Jan. 12, 1960 G. T. BAKER ET AL 2,921,138

TELEPHONE SYSTEMS

Filed June 5, 1956 7 Sheets-Sheet 1

Inventors
George Thomas Baker and
John Lawley Smith by
[signature]
attorney

George Thomas Baker and John Lawley Smith Inventors
by Deane Steinberg attorney

George Thomas Baker and John Lawley Smith
Inventors
by Deane [illegible] Attorney Jan. 12, 1960 G. T. BAKER ET AL 2,921,138

TELEPHONE SYSTEMS

Filed June 5, 1956 7 Sheets-Sheet 4

George Thomas Baker and John Lawley Smith
Inventors
by Deane Steinberg Attorney

George Thomas Baker and John Lawley Smith
Inventors
by Deane Heinberg attorney

Jan. 12, 1960 G. T. BAKER ET AL 2,921,138

TELEPHONE SYSTEMS

Filed June 5, 1956 7 Sheets-Sheet 6

George Thomas Baker and John Lawley Smith
Inventors by Deane Steinberg
Attorney

George Thomas Baker and John Stanley Smith
Inventors by
Deane Stanley Attorney

United States Patent Office 2,921,138

Patented Jan. 12, 1960

2,921,138

TELEPHONE SYSTEMS

George Thomas Baker and John Lawley Smith, Taplow, England, assignors to British Telecommunications Research Limited, Taplow, England, a British company Application June 5, 1956, Serial No. 589,506

Claims priority, application Great Britain June 7, 1955

18 Claims. (Cl. 179—18)

Figure 1:
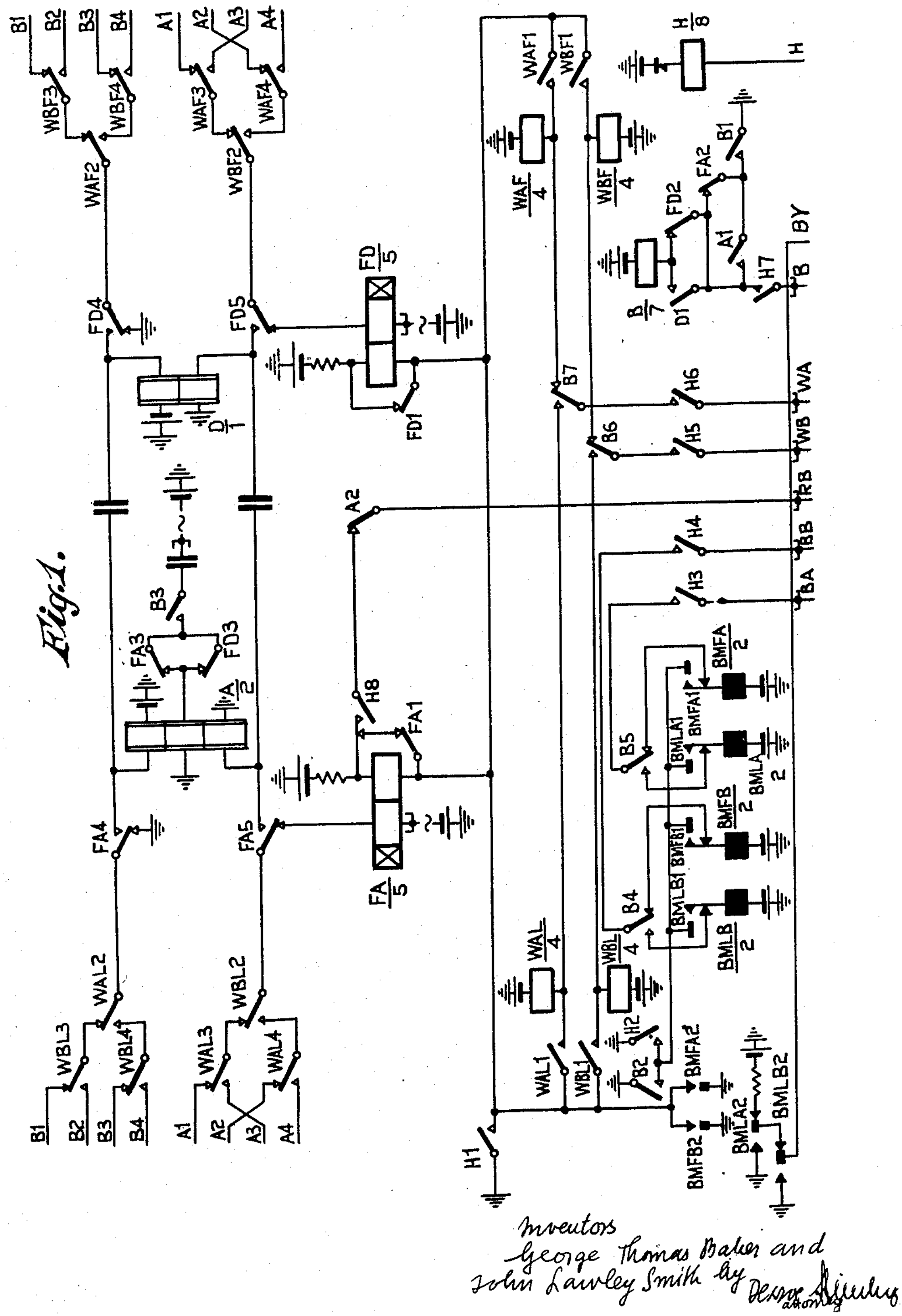

The present invention relates to telephone systems and is more particularly concerned with such systems in which the setting up of connections is controlled by a high-speed register device such as a magnetic drum. The possibility of use of such register devices in telephone systems is now well understood and it has been appreciated that in view of the large capacity of such devices and the fact that they can be associated with individual lines on a time division basis at very short intervals it is quite feasible for the register device to remain associated with a connection throughout the conversational period. This enables various additional facilities to be provided; for instance time metering may be provided economically under the control of a magnetic drum. The chief object of the present invention is to employ such devices to provide a further facility, particularly in a comparatively small network, namely that if the wanted party is busy when he is called, the call is stored and automatically completed when the party in question becomes free.

According to the invention in a telephone system having the setting up of connections controlled by a high speed register device such as a magnetic drum on which details of the wanted party are registered, these details are retained if it proves impossible to set up the call at the first attempt and further attempts are made at suitable intervals even after the calling party has hung up. Most conveniently both parties are rung simultaneously but it could also be arranged that the called party was not rung until the calling party was again on the line in case he was no longer available after a protracted delay.

The invention will be better understood from the following description of one method of carrying it into effect which should be taken in conjunction with the accompanying drawings comprising Figs. 1–7.

In the example illustrated it is assumed that the setting up of connections is effected by means of crossbar switches which are operated to extend connections from opposite ends of a suitable number of transmission bridges, thus acting as line finders and final selectors respectively. It is assumed moreover than an 80-line exchange is concerned which is catered for by two line finders and two final selectors, each of these switches having a so-called wiper-switching arrangement to enable it to cater for 40 lines instead of the 20 which is normal for switches as usually constructed. The number of bridges can be arbitrarily varied in accordance with the expected traffic but it is assumed that 10 bridges are provided corresponding to known mechanical constructions of crossbar switch.

The register device employed is assumed to be of the well-known magnetic drum type and it will be understood that though the use of a cylinder rotating about its axis is generally most convenient in practice, use could also be made of a disc or endless tape. The control arrangements whereby the magnetic drum controls the setting of the crossbar switches are generally similar to those described in application Ser. No. 357,474 of G. T. Baker, filed May 26, 1953, with suitable modifications to achieve the purpose of the invention.

Figure 2:
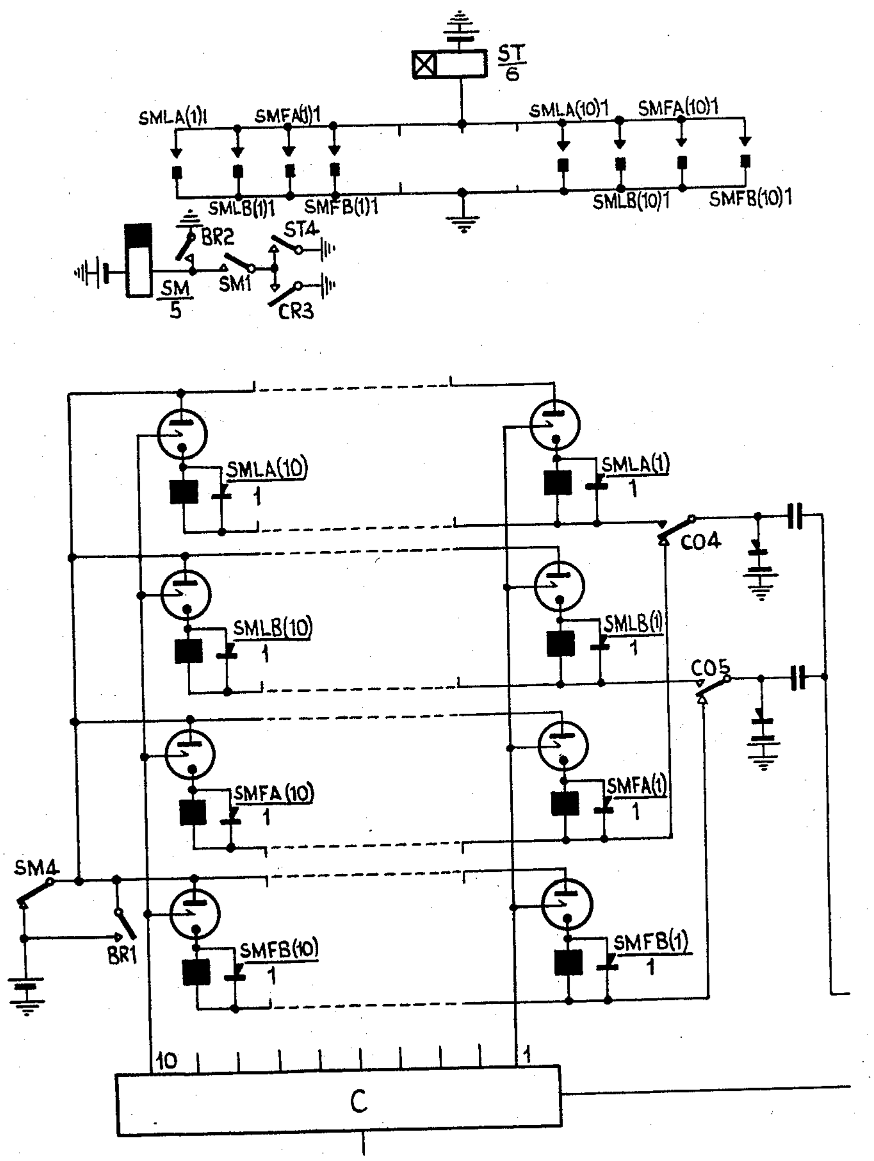
Figure 3:
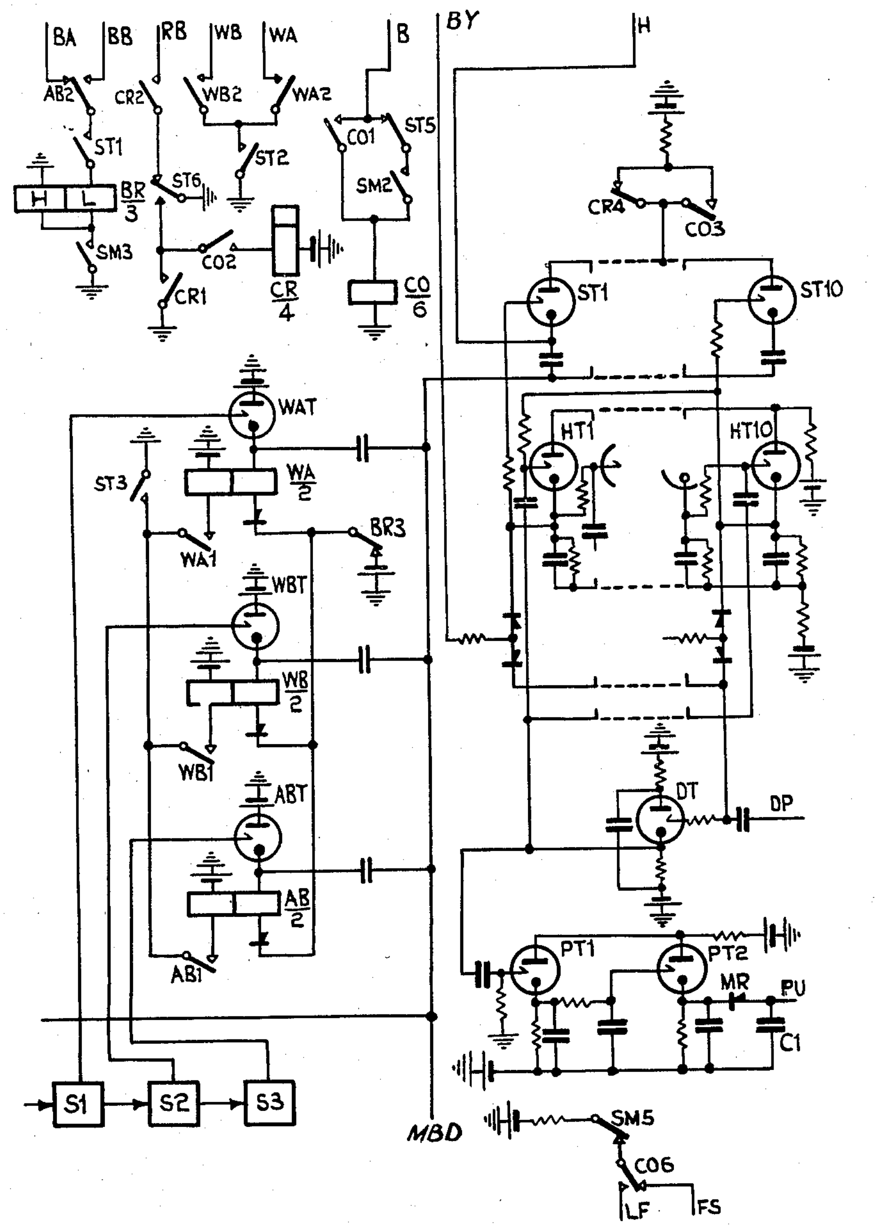
Figure 4:
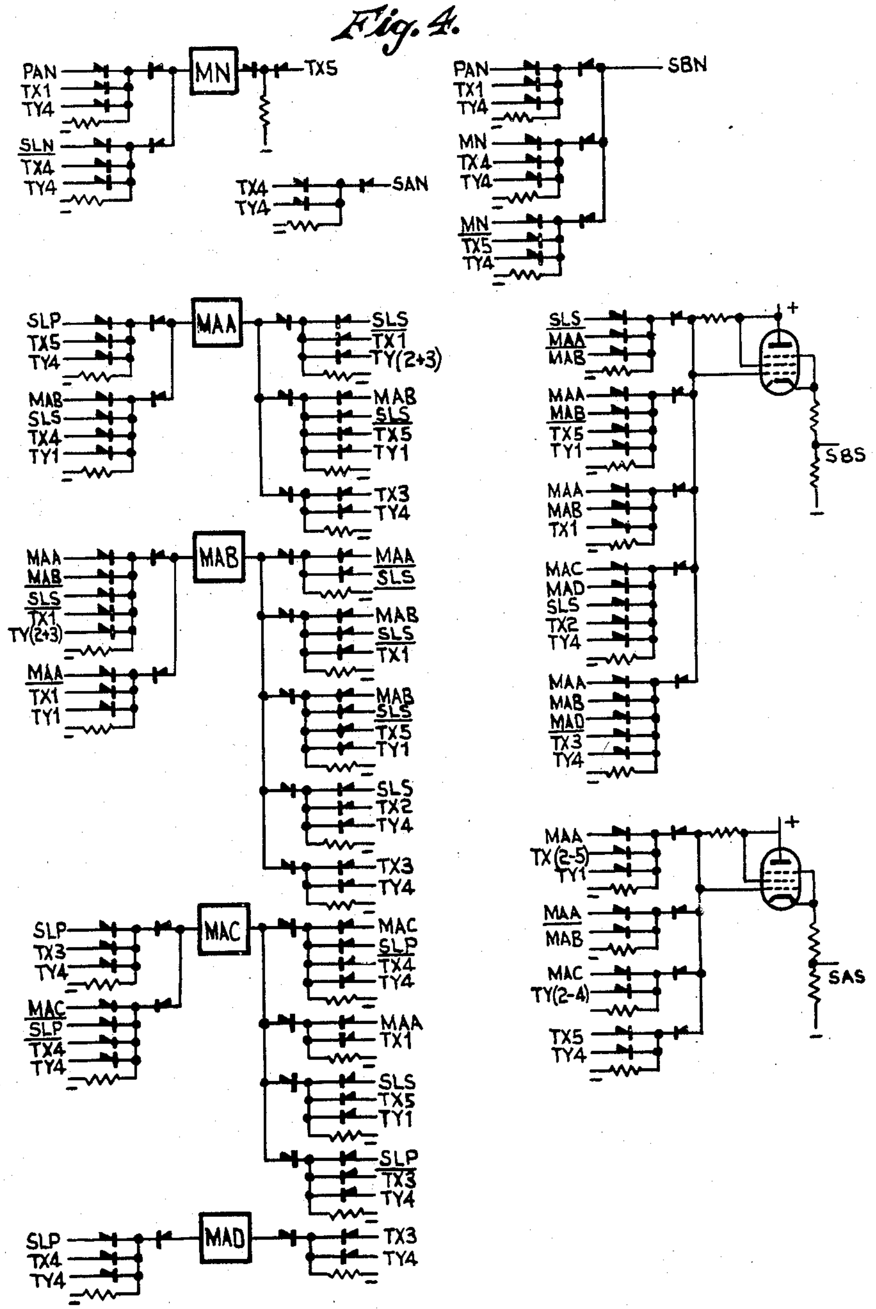
Figure 5:
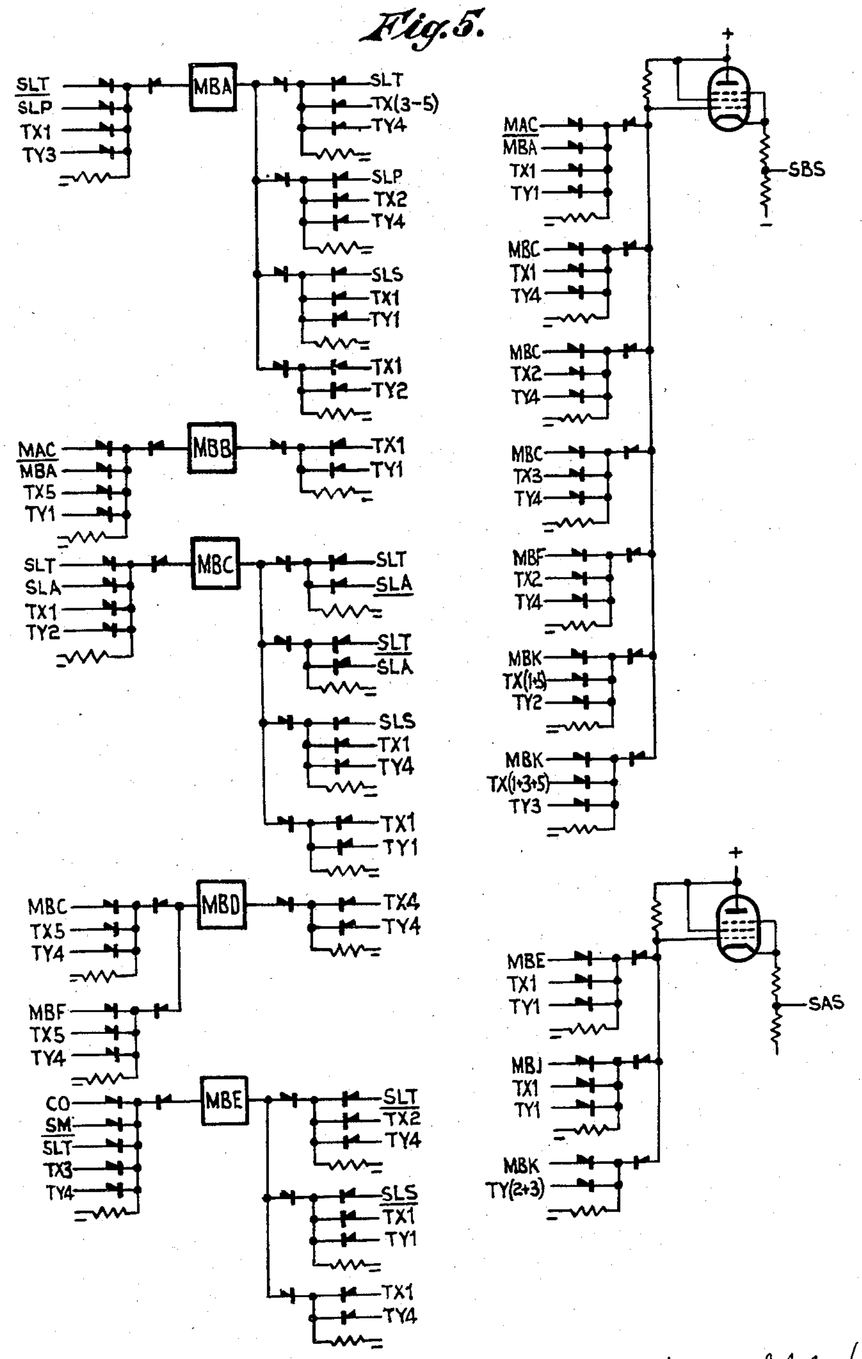
Figure 6:
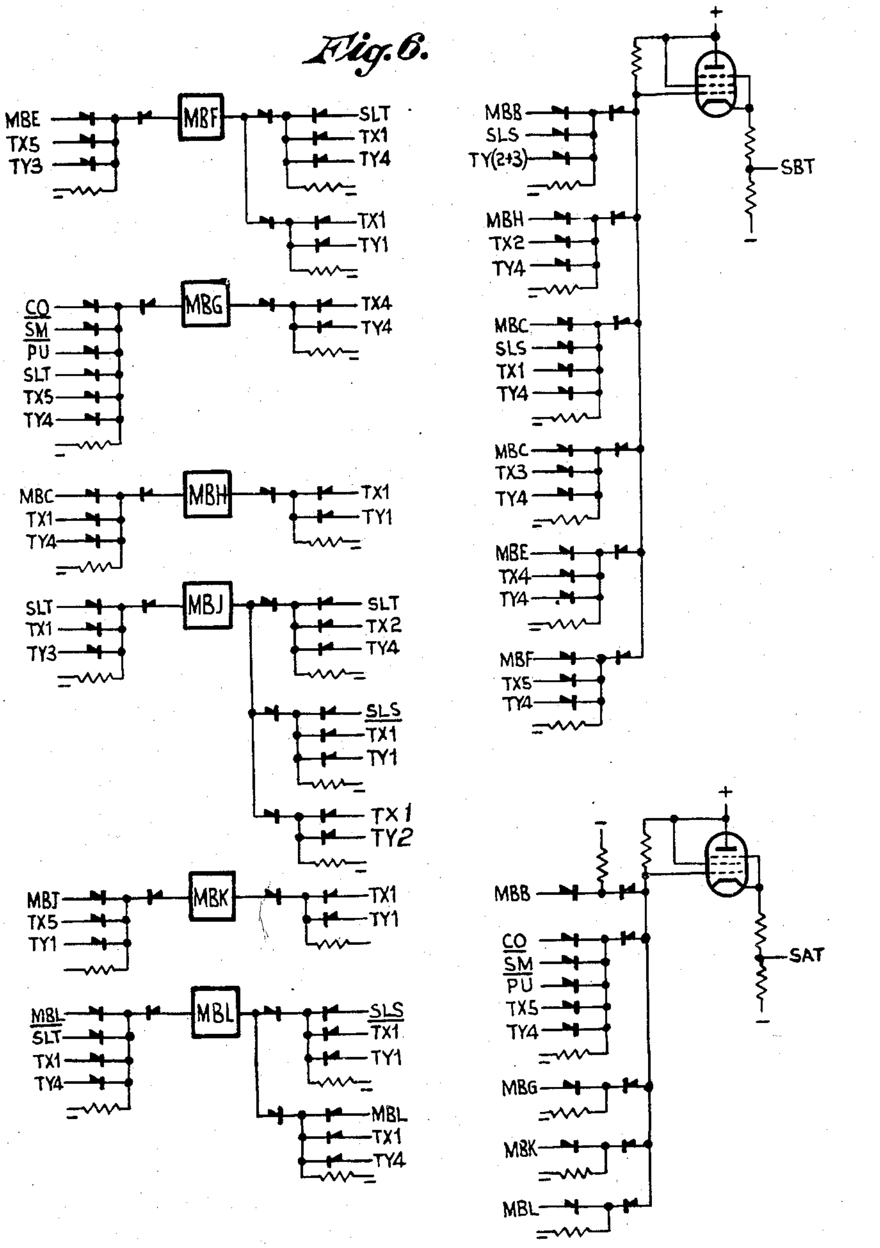
Figure 7:
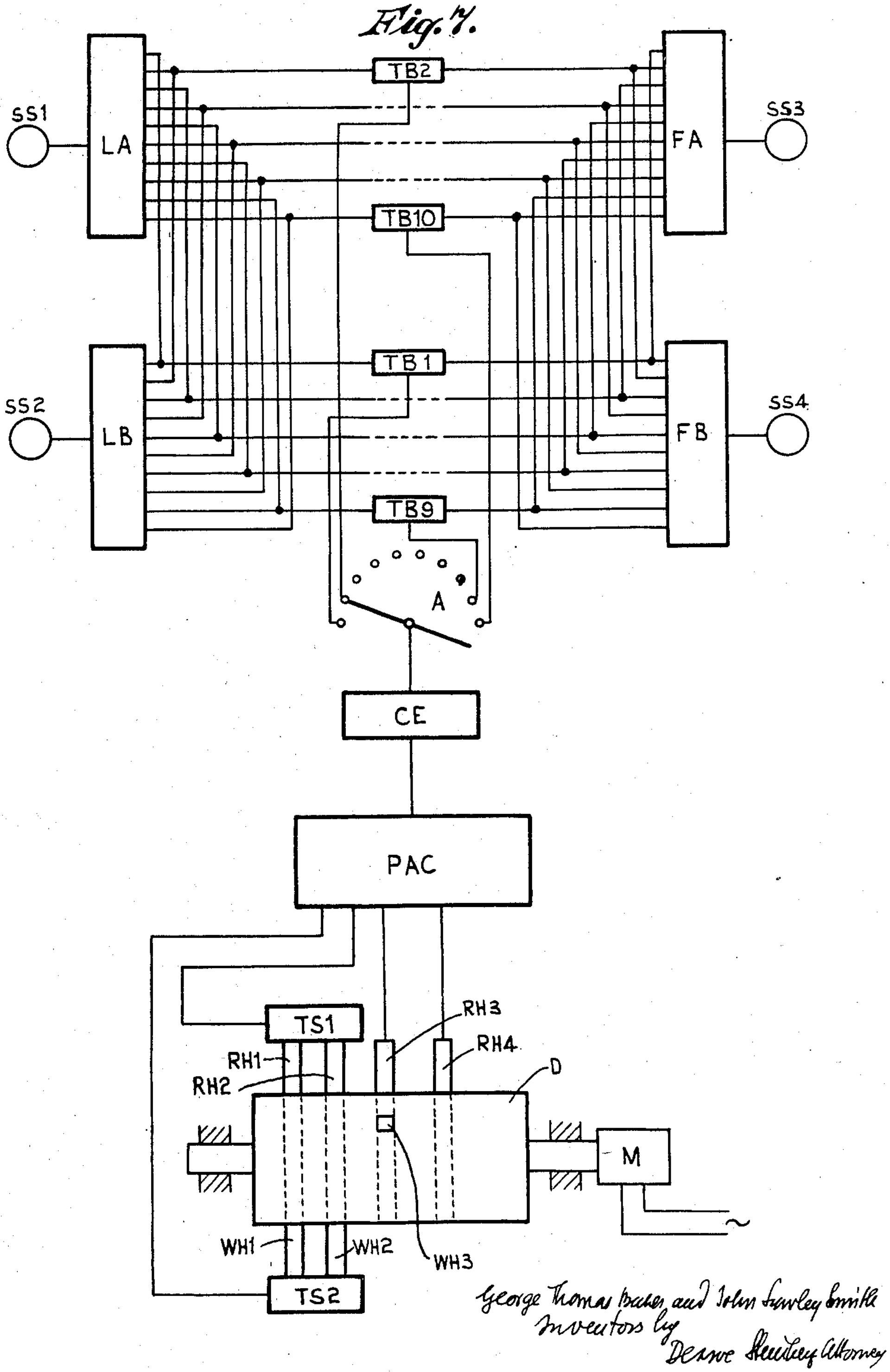

Of the drawings, Fig. 1 shows one of the transmission bridges and the selection circuit for the appropriate magnets of the bridge being used, Fig. 2 shows the common equipment used for effecting the operation of the appropriate select magnets and Fig. 3 that for wiper selection and allotting the appropriate bridge. Figs. 4–6 indicate in conventional manner the essential circuits associated with the magnetic drum to enable it to bring about appropriate operation of the crossbar switches. These switches are assumed to be of conventional type but having select magnets suitable for operation in series with a gas discharge tube. Fig. 7 shows a general layout of the system in order to permit a better understanding of the relationship of the various parts.

The general layout of the system will first be described in conjunction with Fig. 7. This shows on the left the two finder switches LA and LB to which typical subscribers' stations SS1 and SS2 are shown connected. Similarly on the right-hand side there are shown the two final selectors FA and FB and these have been shown as giving access to two typical sub-stations SS3 and SS4. It will be understood that the line finders LA and LB together have access to all the stations of the system including SS3 and SS4 and similarly the final selectors FA and FB together have access to all the sub-stations of the system including SS1 and SS2.

The line finders and the final selectors are respectively connected in parallel and it is assumed as already mentioned that ten transmission bridges are provided. Four of the ten bridges are indicated, namely TB1, TB2, TB9 and TB10 and each of these represents equipment such as is shown in Fig. 1. The bridges are pre-selected for use in turn by the allotter A which corresponds to the ring of hunting tubes HT1–HT10 and seizing tubes ST1 and ST10 shown on the right-hand side of Fig. 3 as described in greater detail hereinafter. The allotter is associated with the control equipment CE which may be considered to be equivalent to the remainder of the equipment shown in Figs. 2 and 3 except that the select magnets SM are of course associated with the appropriate crossbar switches.

The equipment CE of Figs. 2 and 3 is controlled from the drum by way of the equipment PAC which includes the control panels later described and indicated in Figs. 4–6. The drum itself, which is indicated at D, is of known type conveniently having a very thin plating of nickel and for the purpose of illustration it is shown as mounted in bearings with its axis horizontal and driven at constant speed by an electric motor M. For the purpose of the present invention it is provided with two register tracks, a transfer track and an address track. The first register track has associated with it a reading head RH1 and a writing head WH1 and similarly the other register track has reading head RH2 and writing head WH2. These heads are rendered effective in turn under the control of the track switching equipment TS1 for the writing heads and TS2 for the reading heads. The track switching equipment is preferably of a static nature controlled by the so-called TW pulses. Conveniently the reading and writing heads of a track are located at diametrically opposite positions and only 180° of the track space is effectively used as more fully explained subsequently, but this arrangement is not essential. The transfer track has a reading head RH3 and writing head WH3 but these are not spaced apart 180° but only the distance of one register and are arranged to operate on a regenerative basis so that information fed into the writing head is repeated round the track. A further reading head RH4 is provided for the address track and since this track contains permanent information which is not changed during the ordinary operation of the system, no writing head has been shown.

Considering now the operation of the equipment shown in Figs. 1–3, it will be assumed that a calling party has dialled the number of a wanted party which is accordingly registered on the drum in the track space allocated to the calling party as will be described in connection with Figs. 4–6. A test is now made to ascertain whether the wanted line is free, that is to say whether it is already looped, and assuming it is idle, connection is made therewith and the subscriber is rung. This connecting operation is controlled from the drum in that a pulse in a time position characteristic of the called party becomes effective to trigger the appropriate gas discharge tube having in series therewith the required select magnet. As in the specification previously referred to, an electronic ring counter device C is provided which is operating continuously in response to regularly-spaced pulses and this is arranged to prime the trigger electrodes of the gas discharge tubes in turn. The determination of which tube shall strike is effected by the time relationship of a pulse in the cathode circuit, this timing being varied in accordance with the value of the calling and registered wanted numbers dependent on the circumferential position in the track of the calling and called registers respectively. In addition to the ring counter just referred to which has 10 positions, there are also three scale-of-two counters S1, S2 and S3 driven therefrom and dealing with the 8 possible values of the tens digit.

When a subscriber removes his receiver and dials the two digits of a wanted number these digits are recorded on the magnetic drum in the position corresponding to the calling party in the manner explained in connection with Figs. 4–6.

As shown on the right-hand side of Fig. 3 an allotter circuit is provided for the transmission bridges and serves to pre-select a further free bridge as soon as the one previously selected is taken for use. It comprises the ring of hunting tubes HT1 . . . HT10 and the associated group of seizing tubes ST1 . . . ST10 together with the drive tube DT. Pulses of suitable duration and frequency are applied continuously to lead DP but only produce any effect on the tube DT when it is suitably primed.

The tubes HT1 . . . HT10 are connected so as to form a continuous ring the cathode of one tube being connected to the trigger electrode of the next in turn to give a priming circuit. In view of the common cathode load resistor and the capacitors and resistors in the individual cathode circuits, only one tube can remain in lighted condition at a time as is well understood. As will be more fully appreciated from the subsequent description, the HT tube corresponding to the pre-selected bridge is always lighted and the associated ST tube is struck when the common equipment is associated with that particular bridge in order to control the setting up of a connection thereover.

A bridge is marked busy over lead BY when one or other of the line finders is operated which will of course be the position throughout the existence of a connection. Assuming that the circuit shown in Fig. 1 is being employed for the next connection, the tube HT1 will be struck and ST1 will strike when the setting-up operation commences. When earth is applied to the lead BY on the operation of the finder, it is effective in conjunction with the potential on the cathode of the tube HT1 to prime the tube DT, which is self-extinguishing, so that on the next DP pulse it strikes and provides a pulse from its cathode to each of the HT tubes. In consequence the discharge moves from the tube HT1 to tube HT2 and if the associated bridge is already busy, as represented by earth on the corresponding BY lead, a further pulse is obtained from the tube DT and the discharge is moved to tube HT3. This operation continues until a free bridge is located, when there will be no earth on the BY lead and consequently no further pulse will be obtained from the tube DT.

Pulses from the tube DT are also fed to a toggle circuit comprising a pair of gas discharge tubes PT1 and PT2. These pulses are applied to the trigger electrode of one of the tubes PT1 the cathode of this tube being connected to the trigger electrode of the other tube PT2. When no hunting is taking place, tube PT2 is conducting and lead PU, which is connected to its cathode by way of a rectifier MR, tends to become positive since a capacitor C1 connected between lead PU and negative is charged slowly through the back resistance of the rectifier. While hunting is in progress however, the tube PT1 is struck by the pulses operating the hunting tubes and tube PT2 is extinguished. The capacitor accordingly discharges rapidly through the forward resistance of the rectifier and the potential of PU becomes negative. The purpose of this arrangement will appear from the description of Figs. 4–6.

In response to the initiating pulse from the drum control equipment over lead MBD which, as will be explained subsequently, occurs on the first operation of relay MBD, the appropriate seizing tube, for instance the tube ST1 corresponding to the first bridge, is struck and thereupon a circuit is completed for the relay H associated with this bridge through the tube ST1 to positive battery by way of contacts CR4. Relay H at contacts H1 and H2 thereupon prepares suitable holding circuits, at contacts H3–H7 connects up the various common control leads to the bridge concerned and at contacts H1 and H8 energises relay FA.

The initiating pulse may also operate one or more of relays WA, WB and AB depending upon whether there is priming potential connected to the trigger electrodes of the tubes WAT, WBT and ABT from the scale-of-two counters S1, S2 and S3 respectively. The state of operation of these counters will depend upon the particular point of time at which the impulse is transmitted over MBD dependent upon the drum control equipment. Assuming that the tube WAT is operated from counter S1, relay WA is energised in series therewith by way of its right-hand winding and at contacts WA1 prepares a locking circuit by way of its left-hand winding and at contacts WA2 prepares a circuit over lead WA extending to Fig. 1. The operation of relays WB and AB, if it takes place, produces generally similar results, relay AB selecting the bridge magnet in the A or B switch as required over lead BA or BB. The initiating pulse is also extended over contacts CO4 and CO5, Fig. 2, to the select magnets of the A and B final selector switches and their associated tubes, to the anodes of which positive potential is normally connected over contacts SM4.

Dependent upon the instant at which the pulse is transmitted in relation to the position of the ring counter C which connects potential in turn to leads 1–10, the appropriate select magnet will be operated in each final selector switch, for instance the magnets SMFA(10) and SMFB(10). Thereupon the associated operating fingers are moved in the usual manner and the off-normal springs SMFA(10)′ and SMFB(10)′ are closed, thereby completing a circuit for relay ST. This at contacts ST1 prepares a circuit for the bridge magnet of the chosen final selector in series with relay BR, at contacts ST2 prepares circuits for relays WAF and WBF, at contacts ST3 completes locking circuits if necessary for relays WA, WB, and AB, at contacts ST4 prepares a locking circuit for relay SM, at contacts ST5 opens a point in the circuit for relays B and CO and at contacts ST6 prepares a circuit for relay CR. The bridge magnet is unable to operate in series with the two windings of relay BR, the left-hand one of which is of high resistance. Relay BR however operates and at contacts BR1 provides a parallel positive supply to the select magnets, at contacts BR2 energises relay SM and at contacts BR3 extinguishes any operated ones of the tubes WAT, WBT and ABT by opening their cathode circuits. Relay SM now operates and at contacts SM1 completes a locking circuit for itself, at contacts SM2 prepares a circuit for relays B and CO, at contacts SM3 short-circuits the high resistance left-hand winding of relay BR, at contacts SM4 removes the initial positive feed to the select magnets and at contacts SM5 removes potential from lead FS. The chosen bridge magnet assumed to be BMFA is now able to operate and it thereupon closes the contacts associated with the operated select finger and at contacts BMFA1 opens the circuit of relay BR and at contacts BMFR2 provides an additional holding earth. Relay BR now releases, whereupon contacts BR1 release the operated select magnets and extinguish the associated tubes so that the off-normal contacts of the select magnets open and permit relay ST to release. This opens the circuit of relay SM at contacts ST4 but since relay SM is slow to release, it does not de-energise immediately. While it holds up, a circuit is completed for relays B and CO in series by way of contacts FD2, H7, ST5 and SM2. Relay B upon operating, at contacts B1 prepares a locking circuit for itself, at contacts B2 provides an additional holding earth for the operated bridge magnet, at contacts B3 connects ringing tone to the third winding of relay A and at contacts B4–B7 changes over the circuits from the final selectors to the line finders. Relay CO at contacts CO1 completes a locking circuit for itself and relay B, at contacts CO2 prepares a circuit for relay CR, at contacts CO3 provides an additional positive feed for the tube ST1, at contacts CO4 and CO5 changes over to the select magnets of the line finders and at contacts CO6 connects up lead LF in place of lead FS.

Shortly thereafter another impulse is received on lead MBD which as before has a time significance but in this case corresponding to the calling subscriber. This impulse produces no effect on the tube ST1 which is already struck and as before there is a possibility of the operation of any one or more of the tubes WAT, WBT and ABT and their associated relays. The pulse will on this occasion operate the appropriate select magnets of the line finder switches for instance SMFA(1) and SMFB(1) since contacts CO4 and CO5 are in operated position and the consequent closing of the appropriate off-normal contacts SMFA(1)′ and SMFB(1)′ will re-energise relay ST. Thereupon relay BR is again energised, this time in series with the bridge magnet of either the A or B finder switch as determined by the state of relay AB. It will be assumed in this instance that relay AB is operated so that the bridge magnet BMLB is the one employed. Relay BR operates relay SM as before and this latter relay by short-circuiting the high resistance winding of relay BR enables the bridge magnet to operate. Thereupon relay BR is released, the select magnets are de-energised and the circuit of relay ST is opened and also lead BY is earthed at contacts BMLB2 to initiate the hunting operation of the allotter.

Owing to the fact that relay CO is operated on this occasion, relay CR is energised on the closing of contacts ST6 and thereupon at contacts CR1 completes a locking circuit for itself, at contacts CR2 prepares the ring-back control circuit, at contacts CR3 completes a further holding circuit for relay SM and at contacts CR4 removes the initial positive feed for the tube ST1. Owing to the operation of the bridge magnet BMLB, the calling line is switched through to relay A and assuming the subscriber is still on the line, as will normally be the case, the relay A operates. Thereupon it completes the locking circuit of relay B and short-circuits relay CO which therefore releases and opens the circuit of relay CR. This latter relay is slightly slow to release however and while it holds up, the anode supply to the tube ST1 is removed and accordingly relay H in series therewith releases and disconnects the common equipment from the selected bridge. When relay CR releases, it again connects up the anode supply to the seizing tubes in readiness for the next operation and it also releases relay SM which again prepares the tubes associated with the select magnets.

Ringing of the called subscriber takes place as soon as the appropriate bridge magnet operates and ringing tone is transmitted to the calling party by way of the middle winding of relay A as soon as connection is made to his line. When the called party replies, relay FD operates, locks up by removing the short-circuit round its left-hand winding, switches the speaking leads through and disconnects ringing tone. Relay D is thereupon operated and at contacts D1 replaces contacts FD2 in the circuit of relay B. During the conversation, relay B is energised over contacts B1, A1 and D1 and at contacts B2 maintains the operated bridge magnets of the line finder and final selector. The final selector bridge magnet at contacts BMFA2 or BMFB2 maintains holding circuits for relays FA and FD and relays WAL, WBL, WAF and WBF if any of these relays have been operated.

The circuit is arranged to give first party release and when either the calling or the called subscriber hangs up, relay B is released owing to the de-energisation of relay A or relay D and the bridge magnets then restore to normal and any other operated relays in the circuit are thereby released.

If the called subscriber is busy when his line is tested, as indicated by a special marking on the drum, to be more fully described in connection with Figs. 4–6, setting of the crossbar switches does not take place and in fact the preselected bridge is not seized. Accordingly the calling party receives no ringing tone and concludes that his correspondent is busy. He thereupon replaces his receiver but a special marking is retained on the drum and subject to the requirements of other subscribers for the use of the transfer track, repeated tests are made on the wanted line. When it becomes free, the circuits previously described for setting up the connection become effective and the appropriate final selector crossbar switch is operated to connect with the wanted line. The operation is slightly different in this case however since it is assumed that the calling party is no longer on the line. It will be recalled that when relay H operated initially, at contacts H3 it removed the short-circuit from the right-hand winding of relay FA and thus enabled the earth connection provided at contacts H1 to become effective to energise the relay. In the present instance, since the calling party is not on the line when the line finder switches through, there is no circuit for relay A. Accordingly relay FA is now short-circuited from earth over contacts ST6 and CR2, lead RB and contacts A2 and H8 and accordingly releases. Thereupon ringing current is applied to the calling line and the ring-back circuit is completed so that if the called party replies first, this ringing tone will be audible to him. The release of relay FA serves to short-circuit relay CO and thus initiate the release of the common equipment as previously described. When the calling party replies, relay FA reoperates and conversation may take place.

It may be mentioned that if for some reason the wanted party remains busy for a considerable time so that the calling party becomes tired of waiting for the connection to be completed, he may initiate a further connection merely by removing his receiver. The circuits for the control of the drum whereby this is brought about will be described in due course.

Considering now the operations directly concerned with the magnetic drum it has already been mentioned that the general arrangements closely resemble those disclosed in application Ser. No. 357,474 of G. T. Baker, filed May 26, 1953. The drum is assumed to be provided with two register tracks each catering for 40 subscribers, an address track including the numbers of the 80 subscribers permanently registered and a transfer track. In the register tracks the storage space allotted to each subscriber consists of four blocks of five units, the middle two blocks being used for registering a called number and the outer two being used for control purposes. The transfer track extends over four blocks only i.e. the reading and writing heads are this distance apart and operate regeneratively so that when a number is transferred thereto, it is repeated round the circumference of the drum. The address track comprises groups of four blocks corresponding to the individual subscribers' numbers and strictly speaking two address tracks will be required corresponding to the two register tracks. If however use is made of the arrangement, which is often convenient, that the register track space only occupies 180° of the circumference of the drum, the address track may be arranged to occupy 360° since this track involves no regeneration and a writing head is not used during the ordinary operation. In these circumstances a single address track suffices with the assumptions made.

A time pulse system is employed corresponding to the division of the storage space just described, the time pulses corresponding to the five elements of a block being referred to as TX1–TX5 and the pulses corresponding to the different blocks of a group being referred to as TY1–TY4.

The control equipment comprises a track panel for each register track and two common panels which are switched to the register tracks alternately in known manner. Each track panel includes a thermionic relay or toggle circuit one of which is shown and will be referred to as MN, Fig. 4, and means for obtaining an output from the reading head and for supplying suitable signals to the writing head. The first common panel includes thermionic relays MAA–MAD, Fig. 4, and the second common panel includes relays MBA–MBL, Figs. 5 and 6. These relays also control the writing operation on the transfer track and are influenced by information extracted therefrom.

It should be explained that the output from the register tracks has been referred to as SLN and its inverse $\underline{\mathrm{SLN}}$, N representing the appropriate number, in this case either 1 or 2. The outputs from the two tracks are selected under the control of timing pulses sometimes referred to as TW pulses and the output thus obtained is referred to as SLS and its inverse $\underline{\mathrm{SLS}}$. A similar notation is employed as regards the controls for effecting writing operations where the notation SAN represents a connection for writing 0 on the particular register track represented by an appropriate value of N and similarly SBN is the connection for writing a 1. These connections are obtained from the connections SAS and SBS after suitable distribution by the timing pulses TW. It will be understood also that the output from the transfer track is referred to as SLT and its inverse as $\underline{\mathrm{SLT}}$, while the output from the address track is referred to as SLA.

Considering now the operation of the equipment individual to a register track, when a subscriber removes his receiver, an output is obtained from the appropriate output lead PAN over suitable scanning equipment represented by timing pulses TZ as explained in the specification previously mentioned. This output effects a marking in the first element of the fourth block of the subscriber concerned on the associated register track. This may be expressed, using the convenient notation now generally adopted for the circuits shown graphically in Fig. 4, as:

PAN.TX1.TY4—SBN

The same output serves to effect the operation of the thermionic relay MN in the time position corresponding to the first element of the fourth block:

PAN.TX1.TY4—MN

MN is then effective to cause the insertion of a marking in the fourth element of the fourth block to indicate that the subscriber's line is looped:

MN.TX4.TY4—SBN

A reset circuit is provided for relay MN in the time position corresponding to the fifth element of a block:

$\mathrm{TX5}\text{—}\underline{\mathrm{MN}}$

A cancelling circuit for the marking just mentioned is provided however:

TX4.TY4—SAN so that the marking only persists as long as the loop remains unbroken. A further circuit is provided for relay MN, namely:

$\underline{\mathrm{SLN}}.\mathrm{TX4.TY4}\text{—}\mathrm{MN}$ which means that relay MN is operated in this position if there is no marking indicating a looped line. The effect of these various circuits is that as long as the loop remains open, that is to say no call is being made, relay MN is operated in the position TX4.TY4 and is immediately reset. Similarly if the loop remains steadily closed, relay MN is operated in position TX1.TY4 and is again reset in position TX5 and in this case markings are produced in positions TX1 and TX4 of the block TY4.

If the subscriber's loop is found to be closed on one scan and open on the succeeding scan, relay MN will be unoperated when the TX5.TY4 position is reached and a marking is therefore made in this position in the circuit:

$\underline{\mathrm{MN}}.\mathrm{TX5.TY4}\text{—}\mathrm{SBN}$

Such a change in the loop condition will generally indicate that the subscriber is dialling and accordingly that one unit should be added to the registration in block 2 or block 3 depending on which digit is concerned. The effect of this marking on the common equipment will now be considered.

When the marking in TX5.TY4 is detected by the auxiliary reading head located one register length in advance and giving an output SLP, relay MAA is operated in the circuit:

SLP.TX5.TY4—MAA

Relay MAA thereupon clears the timing count in the first block TY1:

MAA.TX(2–5).TY1—SAS

In order that the addition of one unit shall be made only once, a cancelling circuit is provided for the marking in question so that it is removed after it has served its purpose:

TX5.TY4—SAS

It is necessary to ensure that the addition of 1 shall be made in the correct block and this will be the one first encountered after the operation of relay MAA in which there is no busy marking in the first element. On the assumption that the first impulse of the first digit is here concerned, the block in question will be block 2. When this is reached MAB is operated in the circuit:

$\mathrm{MAA}.\underline{\mathrm{MAB}}.\underline{\mathrm{SLS}}.\mathrm{TX1.TY(2+3)}\text{—}\mathrm{MAB}$ At the same time relay MAA is restored in the circuit:

$\underline{\mathrm{SLS}}.\mathrm{TX1.TY(2+3)}\text{—}\underline{\mathrm{MAA}}$

Conditions are now established for adding one to the registration in the block which has just been reached and this is done in the usual manner by reversing the registrations in turn until a 0 has been changed to a 1. With the conditions assumed in which there is no existing registration in positions 2–5 of block 2, what is required is that a 1 shall be inserted in position 2. The operative circuits are:

$\underline{\mathrm{MAA}}.\mathrm{MAB}\text{—}\mathrm{SAS}$ $\underline{\mathrm{SLS}}.\underline{\mathrm{MAA}}.\mathrm{MAB}\text{—}\mathrm{SBS}$ Accordingly when the 0 is encountered in position 2, relay MAB is restored in the circuit:

$\underline{\mathrm{MAA}}.\underline{\mathrm{SLS}}$—$\underline{\mathrm{MAB}}$ and the reversal process is accordingly terminated.

It may be mentioned that a time pulse reset circuit TX3.TY4 is provided for both relay MAA and relay MAB. This circuit is intended to prevent false operation when the equipment is originally started up or if abnormal conditions arise.

When the instruction block TY1 is encountered on the next scan, relay MAB is again operated, in this case, in the circuit:

$\underline{\mathrm{MAA}}$.TX1.TY1—MAB and accordingly the circuits just described are operative to perform the "add 1" operation in the instruction block also, that is to say a 1 is inserted in TX2.TY1. Moreover since the registration of a digit in a particular block has now been started, a marking representing a busying instruction is made in position TX5.TY1 in the circuit:

MAA.$\underline{\mathrm{MAB}}$.TX5.TY1—SBS

Probably on the next scan the calling party's loop will still be open and hence no marking will be made in position TX5.TY4 indicating that 1 is to be added to the number registered in the digit block. Consequently relay MAA will not be operated but relay MAB will operate in the circuit just described so that a further 1 will be added to the timing count in the instruction block.

If the loop still remains open on the next scan, the conditions will be repeated and even when it is subsequently closed, no marking will be made in position TX5.TY4 and consequently no effect will be produced on the digit block but a further 1 will be added to the timing count. When the loop is again opened however for the succeeding impulse, a marking will be produced as before in the position TX5.TY4 and this will operate relay MAA and cause a further 1 to be added to the same digit block and will also clear the timing count by means of the circuit previously described:

MAA.TX(2–5).TY1—SAS and the timing count will be started afresh in the manner just described.

At the end of the digit, the time which elapses before the loop is again opened will be sufficient to permit the timing count to reach 7 that is to say 1 is in each of positions 2, 3 and 4 of block TY1. In these circumstances the usual reset circuit for relay MAB:

$\underline{\mathrm{MAA}}.\underline{\mathrm{SLS}}$—$\underline{\mathrm{MAB}}$ will not have become effective by position TX4.TY1 and since there is a marking in this position also, relay MAA is now operated in the circuit:

MAB.SLS.TX4.TY1—MAA

With both relays MAA and MAB operated, the following circuit becomes effective to insert a marking in the first element of the first block to be encountered having no such marking, in this instance block 2:

MAA.MAB.TX1—SBS and when this point is reached, relay MAB is restored in the circuit:

MAB.$\underline{\mathrm{SLS}}$.TX1—$\underline{\mathrm{MAB}}$

It will be appreciated that if there had been no marking in TX5.TY1 representing a busying instruction, relays MAA and MAB would both have been reset in the circuits:

MAB.$\underline{\mathrm{SLS}}$.TX5.TY1—$\underline{\mathrm{MAA}}$

MAB.$\underline{\mathrm{SLS}}$.TX5.TY1—$\underline{\mathrm{MAB}}$

When the subscriber dials the impulses comprising the second digit, generally similar operations take place but in this instance the first block encountered having no busy marking in the TX1 position is the third block on the register track corresponding to the calling subscriber. Consequently the second block is passed over and the registration of the digit is effected in the third block. At the end of the train of impulses representing the second digit, when the timing count in the first instruction block reaches 7, circuits are completed as before for inserting a busy marking in the first block encountered which has no such marking, that is to say in the first element of the third block. The insertion of this marking signifies that dialling is completed and accordingly that action may now be taken to set up the call.

As already mentioned, the first operation comprises testing the called subscriber's line to see whether it is busy or idle and in the latter event, the appropriate final selector switch is operated to connect therewith and subsequently the appropriate line finder switch is operated to connect with the calling line. If the called line is found to be busy, no operation of either of the crossbar switches takes place and as will be explained subsequently, repeated tests are made to ascertain whether the wanted line is still busy.

In response to the marking in position TX1.TY3, relay MBA, Fig. 5 is now operated from the auxiliary reading head in the circuit:

$\underline{\mathrm{SLT}}$.SLP.TX1.TY3—MBA

The inclusion of the term SLT ensures that this circuit cannot become operative if the transfer track is already in use in which case there would be a marking in the TX1.TY3 position representing a previous transfer from the register track as will be more fully appreciated as the description proceeds.

Since the dialled number is retained in the calling subscriber's register throughout the call and transfer to the transfer track is only required if the call has not yet been set up, a marking termed "call connected" is inserted in TX2.TY4 on a successful call and this serves to reset relay MBA in the circuit:

SLP.TX2.TY4—$\underline{\mathrm{MBA}}$

If for any reason the transfer track has not been completely cleared, there will be markings in one or more of positions 3, 4 and 5 of block TY4 and relay MBA will be reset in the circuit:

SLT.TX(3–5).TY4—$\underline{\mathrm{MBA}}$

Similarly if transfer of the digits has already taken place and the setting of the switches is proceeding, there will be a corresponding marking on the register track indicating which particular subscriber is using the transfer track, and relay MBA is reset in the circuit:

SLS.TX1.TY1—$\underline{\mathrm{MBA}}$

It will be appreciated that the actual switch operation together with that of the associated relays may occupy a time equal to several revolutions of the drum.

If none of these conditions obtains however, relay MBA will remain operated sufficiently long to effect a marking in the first element of block 1 of the calling subscriber's register to indicate that this particular subscriber is using the transfer track:

$\underline{\mathrm{MAC}}$.MBA.TX1.TY1—SBS

Relay MBB is operated in the same circuit and this then effects the transfer of the digits recorded in the register track to the transfer track:

MBB.SLS.TY(2+3)—SBT
MBB—SAT

As already explained the reading and writing heads of the transfer track are located only four blocks apart, i.e. the distance corresponding to one register, and are connected so as to produce regeneration and consequently the number now recorded on the transfer track is repeated at four-block intervals round the circumference of the drum.

On the next scan after the transfer is completed, relay MBC is operated in the circuit:

SLT.SLA.TX1.TY2—MBC and it may be mentioned here that numbers on the address track which are not in use have no marking in position TX1.TY2 and this enables NU tone to be given, as described subsequently, to a calling party who dials any such unallotted number.

Relay MBC serves to effect comparison between the digits set up on the transfer track and the various digits representing all possible values used in the system which are permanently registered on the address track. As long as there is any discrepancy between the digits on the two tracks, relay MBC is reset by one or other of the circuits:

SLT.SLA—MBC $\underline{\text{SLT}}.\overline{\text{SLA}}\text{—}\underline{\text{MBC}}$ When however correspondence is found, relay MBC is still operated at the beginning of the fourth block and serves to mark the called subscriber busy on the register track in the circuit:

MBC.TX1.TY4—SBS

Relay MBH is operated in the same circuit and thereupon inserts a marking on the transfer track to indicate that the called subscriber has been found:

MBH.TX2.TY4—SBT while relay MBC inserts a marking which may be termed "call connected" in the called subscriber's portion of the register track in the circuit:

MBC.TX2.TY4—SBS and a further marking in position TX3 which may control ring-back when he is calling but now serves another purpose:

MBC.TX3.TY4—SBS

If however the called subscriber is busy, there will be a marking in position 1 of the fourth block on the register track and relay MBC is reset in the circuit:

$\text{SLS.TX1.TY4—}\underline{\text{MBC}}$ and consequently the markings just referred to in positions 2 and 3 are not made. Instead a marking to indicate that the called subscriber is busy is made on the transfer track in the circuit:

MBC.SLS.TX1.TY4—SBT

Assuming however that the subscriber is idle so that the connection can be set up, a marking is made on the transfer track in position 3 of the fourth block in the circuit:

MBC.TX3.TY4—SBT and in these circumstances relay MBC is not reset until TX1.TY1 and before this happens, it effects the operation of relay MBD:

MBC.TX5.TY4—MBD

Relay MBD when operated applies a pulse over lead MBD, Fig. 3, to the various switch and relay operating tubes and since the instant of operation of relay MBD is dependent upon the position on the drum of the called subscriber's register, this pulse has a time significance and is therefore applied to the trigger electrode of the gas discharge tube associated with the appropriate select magnet as already described and explained in greater detail in the specification previously mentioned. The time position of this pulse will also determine which, if any, of the relays WA, WB and AB are to be operated dependent upon the state of the scale-of-two counters S1, S2 and S3. The MBD pulse also brings about the striking of the appropriate seizing tube such as ST1 and hence the operation of relay H as described in connection with Figs. 1–3. Relay MBD is reset over the circuit:

$\text{TX4.TY4—}\underline{\text{MBD}}$ so that the duration of the pulse is practically the scanning time of four blocks of the drum.

The pulse from relay MBD initiates the operation of the final selector crossbar switch as described in connection with Figs. 1–3 and when the setting is completed, relay CO is operated and changes over its contacts so as to apply negative to lead LF when relay SM releases. A circuit is now completed for relay MBE as follows:

$\text{CO.}\overline{\text{SM}}\text{.SLT.TX3.TY4—MBE}$

This circuit it will be noted is dependent upon the marking which was made in position TX3.TY4 of the transfer track. The operation of relay MBE then produces a marking on the transfer track which may be described as "ready for line finder pulse":

MBE.TX4.TY4—SBT

The operation of the line finder however needs to be in accordance with the position of the calling subscriber's register and the further pulse to be produced by relay MBD must therefore reflect the time position of this subscriber. Relay MBE is accordingly repeatedly reset in the circuit:

$\underline{\text{SLS}}\text{.TX1.TY1—}\underline{\text{MBE}}$ in respect of all subscribers except the calling subscriber whose register position TX1.TY1 is marked to indicate that he is using the transfer track. When the appropriate position is reached however, relay MBE remains operated sufficiently long to operate relay MBF in the following circuit:

MBE.TX5.TY3—MBF and slightly prior to this relay MBE clears the marking indicating that the transfer track is in use:

MBE.TX1.TY1—SAS

If the called subscriber is busy, there is a marking on the transfer track and relay MBF is immediately reset in the circuit:

$\text{SLT.TX1.TY4—}\underline{\text{MBF}}$ but if, as is assumed, this circuit is not operative, relay MBF marks the calling subscriber's position on the register track with a marking indicating "call connected":

MBF.TX2.TY4—SBS and relay MBD is then again operated to send a pulse which on this occasion will serve for setting the finder crossbar switch to connect with the calling party:

MBF.TX5.TY4—MBD

At the same time a marking is inserted on the transfer track indicating "finder pulse sent":

MBF.TX5.TY4—SBT

When the equipment of Figs. 1–3 has been operated and relays CO, CR and SM have been released as above described, relay MBG is operated in the circuit:

$\underline{\text{CO}}.\underline{\text{SM}}\text{.PU.SLT.TX5.TY4—MBG}$ and the transfer track is then cleared by the circuits:

$\underline{\text{CO}}.\underline{\text{SM}}\text{.PU.TX5.TY4—SAT}$

MBG—SAT

The necessary PU potential is obtained as described earlier and signifies that the next free bridge has been selected.

MBG is reset at TX4.TY4.

The called party's number remains registered on the calling party's portion of track until the calling party hangs up after a successful call, whereupon the opening of the loop causes the removal of the marking in TX4.TY4 and relay MAC is operated from the auxiliary reading head:

MAC.SLP.TX4.TY4—MAC

Thereupon it cancels the information in the calling party's portion of the register in the circuit:

MAC.TY(2–4)—SAS

It may be pointed out that this cancel operation is prevented during dialling since if the addition of one unit is to take place, relay MAA is operated and resets relay MAC in the circuit:

MAA.TX1—MAC

Similarly if the timing count prior to busying the digit just recorded has not been completed, there is still a marking in TX5.TY1 and this serves to reset MAC in the circuit:

SLS.TX5.TY1—MAC

Relay MAC also serves to effect cancellation in the called subscriber's portion of the register but premature action is prevented by the marking in TX3.TY4 which serves to control the ring-back facility for a calling subscriber as will be described shortly. The marking in question serves to operate MAC:

SLP.TX3.TY4—MAC but as long as there is no loop on the called line, relay MAC is reset immediately:

MAC.SLP.TX4.TY4—MAC

When the called party replies, a loop indication is received so that relay MAC is not reset in the above circuit but remains energised sufficiently long to effect cancellation:

MAC.TY(2–4)—SAS

Moreover relay MAD is operated by the marking now obtained:

SLP.TX4.TY4—MAD and this prevents the cancellation of the "call connected" marking which it is desired to retain:

MAC.MAD.SLS.TX2.TY4—SBS

As already explained, it is arranged according to the invention that if the called subscriber is busy when his line is first tested, no switch operation takes place but repeated tests are made on the line and when it becomes free, connection is made thereto and the calling party is rung if he has hung up in the meantime.

It will be appreciated that if the called party is busy when his line is tested, this will be indicated by a marking in position TX1.TY4 in his portion of the register track and this effects the resetting of relay MBC as previously described in the circuit:

SLS.TX1.TY4—MBC

As a consequence no circuit can be completed for relay MBD in the TX5.TY4 position and no pulse is therefore sent for operating the final selector or for performing the operations which normally follow therefrom.

As previously mentioned, in the same position a marking is made on the transfer track:

MBC.SLS.TX1.TY4—SBT and on the next scan of the transfer track, that is to say in association with the succeeding subscriber's register, relay MBL is operated:

MBL.SLT.TX1.TY4—MBL

In view however of the fact that only the calling subscriber has a marking in the TX1.TY1 position, relay MBL is reset each time until the calling subscriber's position is reached:

SLS.TX1.TY1—MBL

Since however relay MBL then remains energised during the scanning of the second and third blocks it clears the transfer track:

MBL—SAT and is then reset:

MBL.TX1.TY4—MBL

The transfer track then becomes available to other calling subscribers and the original calling subscriber takes his turn for seizing the transfer track again when it is free in order to test the state of the called line repeatedly.

As previously mentioned, since the calling party does not hear ringing tone if the wanted party is busy, he will replace his receiver, thereby opening the loop. It will be appreciated that the usual effect of this is that an attempt is made to add 1 to the first recording block having its control element TX1 unmarked. Since both recording blocks associated with the calling subscriber have already registered the wanted number, the "add 1" operation cannot in fact take place. The usual timing count is effective however and when it has reached 7, relays MAA and MAB are both operated as for the insertion of the busying indication. The effect in this case however is to bring about the insertion of the ring-back marking in the circuit:

MAA.MAB.MAD.TX3.TY4—SBS

This operation does not take place if the call has been connected because the "call connected" marking in TX2.TY4 resets relay MAB in the previous TX time position:

SLS.TX2.TY4—MAB

This marking moreover is not made if the subscriber should dial more than two digits since relay MAD is operated if the subscriber is still on the line.

It will be appreciated that the system is arranged so that the stored call will be completely subsequently when the called subscriber becomes free however long this may take. If however the calling subscriber should get tired of waiting for the original call to come through and wishes to make another call, this is possible in view of the ring-back marking in TX3.TY4. As long as the line is open, relay MAC is repeatedly operated due to the ring-back marking in the circuit:

SLP.TX3.TY4—MAC but is reset each time in the circuit:

MAC.SLP.TX4.TY4—MAC

When the line is again looped however, this reset circuit is no longer operative and relay MAC accordingly remains operated and effects cancellation in the circuit:

MAC.TY(2–4)—SAS

It is accordingly then possible for a new number to be registered in blocks 2 and 3 and a corresponding call may be set up.

It may be mentioned that the occurrence of the term MAC in the circuit for relay MBB and that for marking possession of the transfer track, namely:

MAC.MBA.TX1.TY1—SBS is to prevent false operation if the subscriber dials one digit only and then hangs up. In this case relay MAC is operated in the circuit:

MAC.SLP.TX4.TY4—MAC and can only be reset in the following circuit:

SLP.TX3.TY4—MAC so that it effects cancellation of the partially-set-up number.

The circuit shown includes provision for giving a calling party NU tone if he dials a number which has not been assigned. Such numbers have no marking in the position TX1.TY2 on the address track and accordingly no circuit is provided for the operation of relay MBC. In normal operation relay MBJ is operated in the circuit:

SLT.TX1.TY3—MBJ due to the busy marking in block 3 of the transfer track which has been transferred from the register track. This circuit it will be appreciated becomes effective immediately the calling subscriber's position has been passed since it is in this position that transfer is effected to the transfer track. In each subsequent register position a reset circuit will be completed for relay MBJ namely:

SLS.TX1.TY1—MBJ since it is only in the position of the calling subscriber that there is a marking in TX1.TY1. Moreover when the called party is found, there is a marking in TX2.TY4 so that relay MBJ is reset in the circuit:

SLT.TX2.TY4—MBJ

If however a complete scan is made without the called subscriber being found, that is to say the position of the calling subscriber is again reached, neither of the reset circuits just mentioned is operative and relay MBJ remains operated to the end of block TY1 and a circuit is accordingly completed for relay MBK:

MBJ.TX5.TY1—MBK

Relay MBK then clears the transfer track:

MBK—SAT and writes a predetermined number, in this case 80, on the calling subscriber's portion of the register track by means of the circuits:

MBK.TX(1+5).TY2—SBS
MBK.TX(1+3+5).TY3—SBS
MBK.TY(2+3)—SAS

As a consequence a connection is now set up to line 80 and this is not used as a subscriber's line but is wired to provide number unobtainable tone. The calling party on hearing this tone will hang up and the connection will be released in the usual manner. The circuit just described also serves to give NU tone if a subscriber should dial his own number.

It may be noted that only one subscriber can be given NU tone at a time but this is not considered of serious importance since the holding time will normally be very short and moreover if the NU tone circuit is busy, the subscriber will be connected thereto as soon as the previous subscriber hangs up.

It should be mentioned that the various relays are provided with time pulse reset circuits for preventing false operation in abnormal circumstances and these circuits will be apparent from Figs. 4–6.

We claim:

1. In a telephone system, an exchange, a plurality of lines extending from said exchange to subscribers' stations, automatic switches in said exchange for completing speaking connections between any two of said lines, a drum in said exchange having a surface of magnetic material, means for rotating said drum about its axis, a writing head arranged to co-operate with said drum to define a circumferential track thereon, means including said writing head for making a record on said track of signals transmitted over a calling one of said lines and representing a called one of said lines, a reading head also co-operating with said track, means including said reading head for testing said called line for busy or idle condition, means also including said reading head for operating said automatic switches under the control of said record to extend a connection to said called line if it is idle, means for repeatedly testing said called line at intervals if it is found busy when first tested, and means for operating said automatic switches to extend a connection to said called line when it is subsequently found to be idle.

2. In a telephone system, an exchange, a plurality of lines extending from said exchange to subscribers' stations, automatic switches in said exchange for completing speaking connections between any two of said lines, a drum in said exchange having a surface of magnetic material, means for rotating said drum about its axis, a writing head arranged to co-operate with said drum to define a circumferential track thereon, means including said writing head for making a record in a portion of said track individual to a calling one of said lines of signals transmitted thereover representing a called one of said lines, a reading head also co-operating with said track, means including said reading head for testing said called line for busy or idle condition, means also including said reading head for operating said automatic switches under the control of said record to extend a connection to said called line if it is idle, means for preventing the erasure of said record on the termination of the calling condition of said calling line if said called line is busy, means for repeatedly testing said called line at intervals if it is found busy when first tested and means for operating said automatic switches under the control of said record to establish a connection between said calling and called lines if said called line is subsequently found to be idle.

3. In a telephone system, an exchange, a plurality of lines extending from said exchange to subscribers' stations, automatic switches in said exchange for completing speaking connections between any two of said lines, a drum in said exchange having a surface of magnetic material, means for rotating said drum about its axis, a writing head arranged to co-operate with said drum to define a circumferential track thereon, means for scanning said lines in synchronism with the rotation of said drum to test for calling condition of said lines, means including said writing head for making a record on said track indicating the busy or idle condition of each of said lines, means also including said writing head for making a further record on said track of signals transmitted over a calling one of said lines and representing a called one of said lines, a reading head also co-operating with said track, means including said reading head for operating said automatic switches to extend a connection to said called line if the record in said track indicates that said called line is idle, means for repeatedly testing said called line at intervals if it is found busy when first tested, and means controlled by said record of transmitted signals for extending a connection thereto if it is subsequently found to be idle.

4. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means for scanning said lines in synchronism with the rotation of said drum to test for calling condition of said lines, means including said writing head for recording on said track the busy or idle condition of each of said lines, means including said writing head for making a record on said track of signals transmitted over a calling one of said lines and representing a called one of the said lines, a reading head also co-operating with said track, means including said reading head for operating said automatic switches to connect with said called line if the record in said track indicates that said called line is idle, means for preventing the operation of said switches if the record in said track indicates that the called line is busy and means for operating said automatic switches to connect with said called line if it subsequently becomes idle.

5. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means for scanning said lines in synchronism with the rotation of said drum to test for calling condition of said lines, means including said writing head for recording on said track the busy or idle condition of each of said lines, means including said writing head for making a record on said track of signals transmitted over a calling one of said lines and representing a called one of said lines, a reading head also co-operating with said track, means including said reading head for operating said automatic switches to connect with said called line if the record in said track indicates that said called line is idle, and means for preventing the operation of said switches if the record in said track indicates that the called line is busy.

6. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means including said writing head for making a record on said track of signals transmitted over a calling one of said lines and representing a called one of said lines, a reading head also co-operating with said track, means including said reading head for effecting the setting of said automatic switches to establish connection between said calling and called lines, and means dependent upon the establishment of a connection between said calling and called lines for erasing said record from said track responsive to the termination of the calling condition of said calling line.

7. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means including said writing head for making a record in a portion of said track individual to a calling one of said lines of trains of impulses transmitted thereover representing a called one of said lines, a reading head also co-operating with said track, means including said reading head and responsive to said record for effecting the setting of said automatic switches to establish connection between said calling and called lines, and means dependent upon the establishment of a connection between said calling and called lines for erasing said record from said track responsive to the termination of the calling condition of said calling line.

8. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means including said writing head for making a record in a portion of said track individual to a calling one of said lines of signals transmitted thereover and representing a called one of said lines, a reading head also co-operating with said track, means including said reading head for testing said called line for busy or idle condition, means also including said reading head for effecting the setting of said automatic switches to establish connection between said calling and called lines if said called line is idle, means for erasing said record from said track responsive to the termination of the calling condition of said calling line after a connection has been established between said calling and called lines, and means for erasing said record from said track responsive to the termination and subsequent re-establishment of the calling condition of said calling line if no connection is established to said called line.

9. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means including said writing head for making a record in a portion of said track individual to a calling one of said lines in response to signals transmitted thereover representing a called one of said lines, a reading head also co-operating with said track, means including said reading head for testing said called line for busy or idle condition, means also including said reading head for operating said automatic switches to connect with said called line if it is idle, means for giving a busy indication over said calling line if said called line is busy, and means for erasing said record from said track responsive to the termination and subsequent re-establishment of the calling condition of said calling line.

10. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means for scanning said lines in synchronism with the rotation of said drum to test for calling condition of said lines, means including said writing head for recording on said track the busy or idle condition of each of said lines, means including said writing head for making a record on said track of signals transmitted over a calling one of said lines and representing a called one of said lines, a reading head also co-operating with said track, means including said reading head for operating said automatic switches to connect with said called line if the record in said track indicates that said called line is idle, means for giving a busy indication over said calling line if said called line is busy and means for erasing said record from said track responsive to the termination and subsequent re-establishment of the calling condition of said calling line.

11. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, means including said writing head for making a record in a portion of said track individual to a calling one of said lines in response to signals transmitted thereover representing a called one of said lines, a reading head also co-operating with said track, means including said reading head for testing said called line for busy or idle condition, means also including said reading head for operating said automatic switches under the control of said record to connect with said called line if it is idle, means for giving a busy indication over said calling line if said called line is busy, means for preventing the erasure of said record from said track on the termination of the calling condition of said calling line in response to said busy indication, means for repeatedly testing said called line at intervals if it is found busy when first tested, means for operating said automatic switches under the control of said record for extending a connection to said calling and called lines, and means for signalling said calling line.

12. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, a reading head also arranged to co-operate with said track, means including said writing head for recording on said track sets of signals transmitted over a calling one of said lines, means responsive to any one of a plurality of different recorded sets of signals for changing said record to a form which is the same for all said sets of signals, and means including said reading head responsive to said changed record for operating said automatic switches to set up a connection from said calling line to a circuit appropriate to all said plurality of different signals.

13. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, a reading head also arranged to co-operate with said track, means including said writing head for recording on said track signals transmitted over a calling one of said lines and representing a called number, means including said reading head responsive to any one of a plurality of records representing different called numbers for changing said record to represent a number which is the same for all said plurality of different records, and means including said reading head responsive to said changed record for operating said automatic switches to set up a connection from said calling line to a circuit appropriate to all said plurality of different called numbers.

14. In a telephone system, a plurality of lines, automatic switches for completing speaking connections between any two of said lines, a drum having a surface of magnetic material, means for rotating said drum about its axis, a writing head arranged to co-operate with said drum to define a circumferential track thereon, a reading head also arranged to co-operate with said track, means including said writing head for recording on said track signals transmitted over a calling one of said lines and representing a called number, means for comparing said record with permanent records of the numbers of said plurality of lines, means effective if said record differs from all of said permanent records for changing said record to a predetermined form, and means including said reading head responsive to said changed record for operating said automatic switches to set up a connection from said calling line to a circuit for supplying a signal indicating that an unassigned number has been transmitted.

15. A telephone system as claimed in claim 11 in which means are provided for applying ringing tone to both calling and called lines so that it will be audible to whichever party replies first.

16. A telephone system as claimed in claim 14 in which the signal supply circuit is tested for busy or idle condition before connection is made thereto and if it is busy when first tested repeated tests are performed and connection is made to it as soon as it is found to be idle.

17. In a telephone system, a plurality of lines, automatic switches for completing speaking connections between any two of said lines, a surface of magnetic material, means for moving said surface in a closed path, means for making a record on said surface of signals transmitted over a calling one of said lines and representing a called one of said lines, means for testing said called line for busy or idle condition, means for operating said automatic switches under the control of said record to extend a connection to said called line if it is idle, means for repeatedly testing said called line at intervals if it is found busy when first tested and means for operating said automatic switches to extend a connection to said called line when it is subsequently found to be idle.

18. In a telephone system, a plurality of lines, automatic switches for completing speaking connections between any two of said lines, a surface of magnetic material, means for moving said surface in a closed path, means for scanning said lines in synchronism with the movement of said surface to test for calling condition of said lines, means for making a record on said surface of the busy or idle condition of each of said lines in response to each scan, means for making a record on said surface of signals transmitted over a calling one of said lines and representing a called one of said lines, means for operating said automatic switches to connect with said called line if the record on said surface indicates that said called line is idle and means for preventing any operation of said switches if the record on said surface indicates that said called line is busy.

References Cited in the file of this patent

UNITED STATES PATENTS

| | | |
|---|---|---|
| 1,857,833 | Baker et al. | May 10, 1932 |
| 2,298,519 | Tillman | Oct. 13, 1942 |
| 2,534,500 | Claesson et al. | Dec. 19, 1950 |
| 2,558,187 | Morrison | June 26, 1951 |
| 2,567,812 | Hickman | Sept. 11, 1951 |
| 2,620,399 | Malthaner | Dec. 2, 1952 |
| 2,679,551 | Newby | May 25, 1954 |
| 2,700,148 | McGuigan et al. | Jan. 18, 1955 |
| 2,764,634 | Brooks | Sept. 25, 1956 |
| 2,819,345 | Nilsson | Jan. 7, 1958 |